United States Patent
Leonard

[15] 3,696,203

[45] Oct. 3, 1972

[54] ADAPTIVE MODEM RECEIVER

[72] Inventor: Jay F. Leonard, Ambler, Pa.

[73] Assignee: Philco-Ford Corporation, Philadelphia, Pa.

[22] Filed: June 3, 1970

[21] Appl. No.: 43,125

[52] U.S. Cl. ....................178/88, 325/323, 325/324, 325/472, 325/474, 325/476, 325/477, 328/162, 328/165, 328/167, 333/18, 333/70 T, 340/146.1 R, 340/172.5, 235/181

[51] Int. Cl. ..............................................H04l 15/24

[58] Field of Search..........179/15 AE, 15 AS, 15 AP; 178/88; 325/41, 42, 65, 323, 324, 472–477; 333/17, 18, 28, 70 T; 328/162, 164, 165, 167; 340/146.1 R, 146.1 AX, 172.5; 235/181

[56] References Cited

UNITED STATES PATENTS 3,614,623 10/1971 McAuliffe ...................325/65

3,524,169 8/1970 McAuliffe et al............333/18

*Primary Examiner*—Albert J. Mayer
*Attorney*—Robert D. Sanborn

[57] ABSTRACT

A modem receiver which provides a measure of transmission channel signal distortion characteristic without the need of transmitted reference pulses by generating in succession progressively more refined estimates of the proper form of received signal, correlating the best estimate of the received signal with a signal representative of signal channel distortion generated over many symbol periods, and utilizing the results of said correlation to form said progressively more refined estimates.

3 Claims, 6 Drawing Figures

INVENTOR.
JAY F. LEONARD
BY
Robert D. Sanborn
ATTORNEY

INVENTOR
JAY F. LEONARD
BY
Robert R. [signature]
ATTORNEY

INVENTOR.
JAY F. LEONARD

ADAPTIVE MODEM RECEIVER

BACKGROUND OF THE INVENTION

The present invention relates to improvements in modems and more particularly to improvements in receiver circuits for modems.

When communicating over band limited channels, for example wire line channels, at rates approaching the capacity of the channel, two sources of transmission errors are present: the noise produced in the transmission medium and in the receiver itself and the interference of sequentially transmitted signals with one another (intersymbol interference). Until fairly recently it has been common practice to transmit data over a wire line at bit rates low with respect to channel capacity. In this situation intersymbol interference problems are minimal and as a consequence, it was possible to design receivers to minimize errors with respect to only the additive noise. Increasing use of digital data transmission over wire lines has made it necessary to more efficiently utilize wire line channels by increasing the bit rate of transmission over such channels. At higher bit rates serious problems are introduced by non-linearities in phase and amplitude characteristics of the channel at band edge. These distortions cause pulse dispersion and intolerable intersymbol interference. For operation near the channel capacity the pulse dispersion is generally of the form of a sin $x/x$ function. However non-uniform amplitude responses and non-linear phase characteristics of actual wire line channels cause the dispersion to differ from a true sin $x/x$ function and the zero crossings to depart from the theoretical $1/2w$ seconds, where $w$ represents the bandwidth in radians. These amplitude and phase responses vary with time on a given line and change considerably as the wire line network is switched between modems at different locations. Therefore it is necessary that the receiver system operate adaptively to overcome the effects of time variations in the system parameters.

Systems have been developed which respond to standard symbols of known form transmitted at preselected intervals periodically to adjust the characteristics of the receiver. The dependence on transmitted reference symbols is undesirable since it adds to the complexity and reduces the message handling capabilities of the system.

It is an object of the present invention to provide an adaptive signal receiver which does not require the transmission of reference signals.

Another object is to provide an adaptive receiver which determines the impulse response of the channel by comparison of a succession of arbitrary received symbols and operates on the received waveform to remove the effects of channel introduced distortions.

A further object of the invention is to provide a receiver circuit which successively estimates the true form of transmitted waveform and utilizes data related to each estimated waveform to generate the next, more refined estimate of true transmitted waveform.

For a better understanding of the present invention together with other and further objects thereof, reference should now be made to the following detailed description which is to be read in conjunction with the accompanying drawings in which

DRAWINGS

DESCRIPTION

Figure 1:
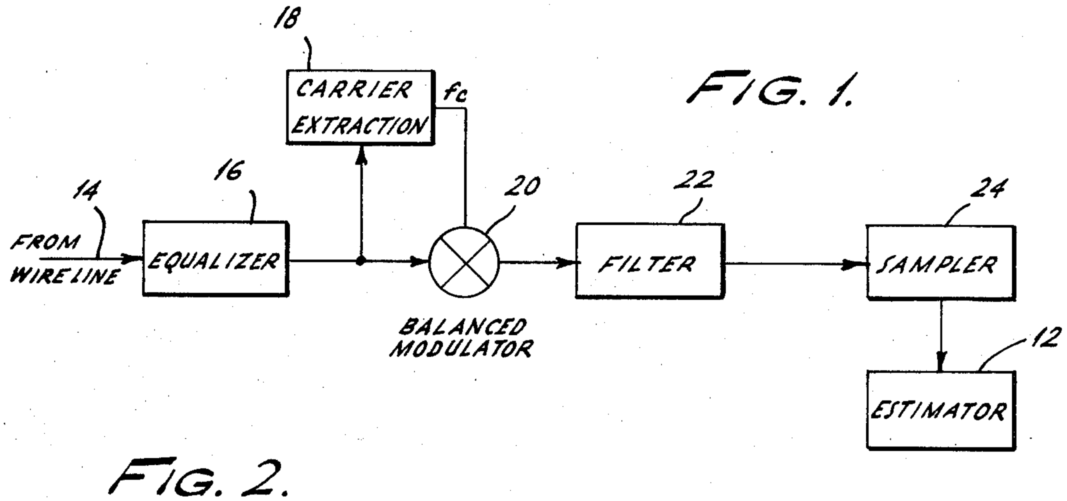
FIG. 1 is a block diagram of a modem receiver which includes the novel signal estimator.

The demodulator portion of a modem, shown in block diagram form in FIG. 1, may be conventional except for the applicant's novel estimator circuit shown at 12. The input signal to the demodulator, received on line 14, may be any linearly modulated signal, for example a two to eight level digital code single sideband modulated on a convenient carrier frequency. For wire line transmission the carrier frequency may be approximately 2,900 Hz. The input signal is supplied first to an equalizer 16 which partially compensates for phase delays introduced by filters at the transmitter and receiver and phase delays introduced by the wire line connecting the transmitter (not shown) to the receiver.

The signal from equalizer 16 is supplied to a carrier extractor circuit 18 and to a balanced modulator 20. Carrier extractor circuit 18 may be a tuned amplifier having a 20 Hz passband centered at 2,900 Hz. The output of circuit 18 forms the carrier signal input to balanced modulator 20. The output of modulator 20 is passed through a low pass filter 22 to a sampler circuit 24. Circuit 24 converts the analog signal passed by filter 22, which roughly represents the analog version of the digital data signal introduced at the transmitter, to pulse signals roughly representative of the digital data signal supplied to the transmitter. In an eight level input signal, the output of sampler 24 may have any one of 256 different levels. The signals at the output of filter 22 and sampler 24 differ from their counterparts at the transmitter due to intersymbol distortion introduced by the limited bandwidth transmission link connecting the transmitter to the receiver and also due to noise introduced along the transmission path. It is the function of estimator 12, which is shown in more detail in FIG. 5, to eliminate the effects of the intersymbol distortion and the unwanted noise signals.

Figure 2:
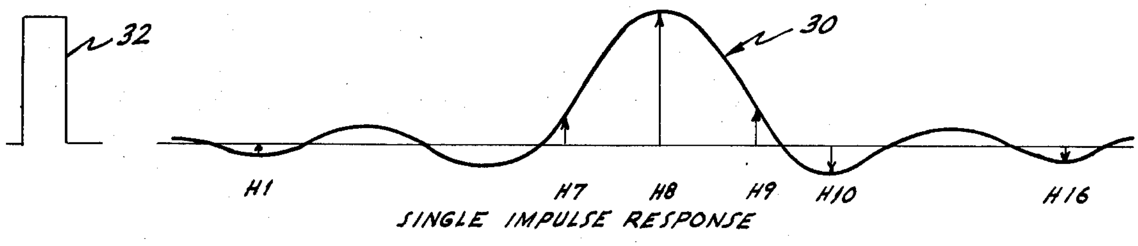
FIG. 2 is a plot showing typical dispersion of a single pulse passed through a channel of limited bandwidth.

FIG. 2 shows at 30 the possible response at the output of filter 22 resulting from the transmission of a single narrow pulse 32. Sampler 24, in effect, generates pulse signals having amplitudes proportioned to the value of $H_1$ to $H_{16}$, respectively.

Figure 3:
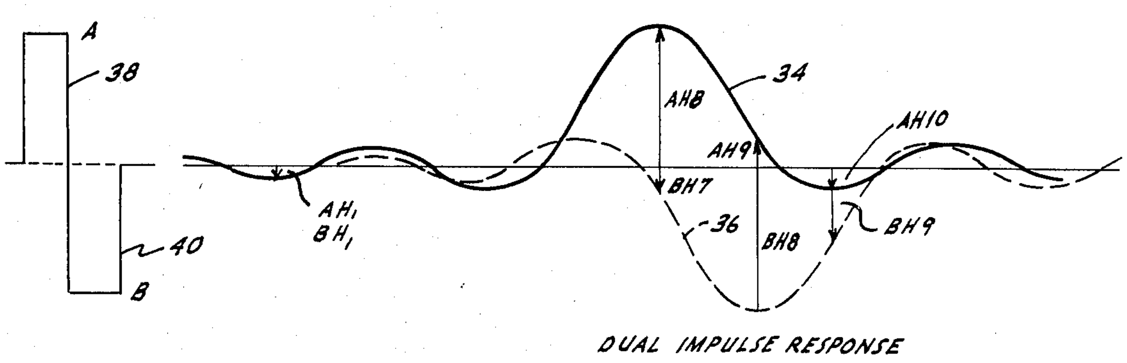
FIG. 3 is a plot showing the intersymbol interference developed when two successive signals are passed through a channel of limited bandwidth.

FIG. 3 shows the responses 34 and 36 to the transmission of a positive pulse 38 followed by a negative pulse 40. The resultant signal at the output of filter 22 would be the algebraic sum of waveforms 34 and 36 and the amplitudes at the output of sampler 24 would be the algebraic sum of $AH_x$ and $BH_y$, where $x$ equals $(y+1)$ and each of $x$ and $y$ has the values 1 to 16. The intersymbol interference is clearly apparent from this FIG. 3.

Figure 4:
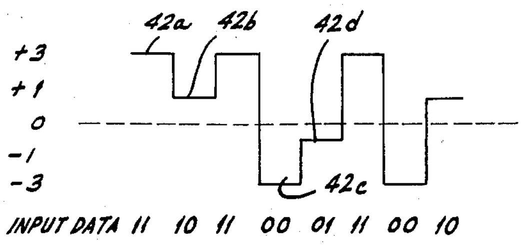
FIG. 4 is a showing of time segment of a typical four level signal which may be employed for data transmission.

FIG. 4 shows the idealized waveform for a typical four level transmission. The additional complexity of four amplitude levels 42*a*, 42*b*, 42*c* and 42*d* instead of two amplitude levels of FIG. 3 makes the effect of intersymbol interference (not shown) even more difficult to eliminate.

Figure 5:
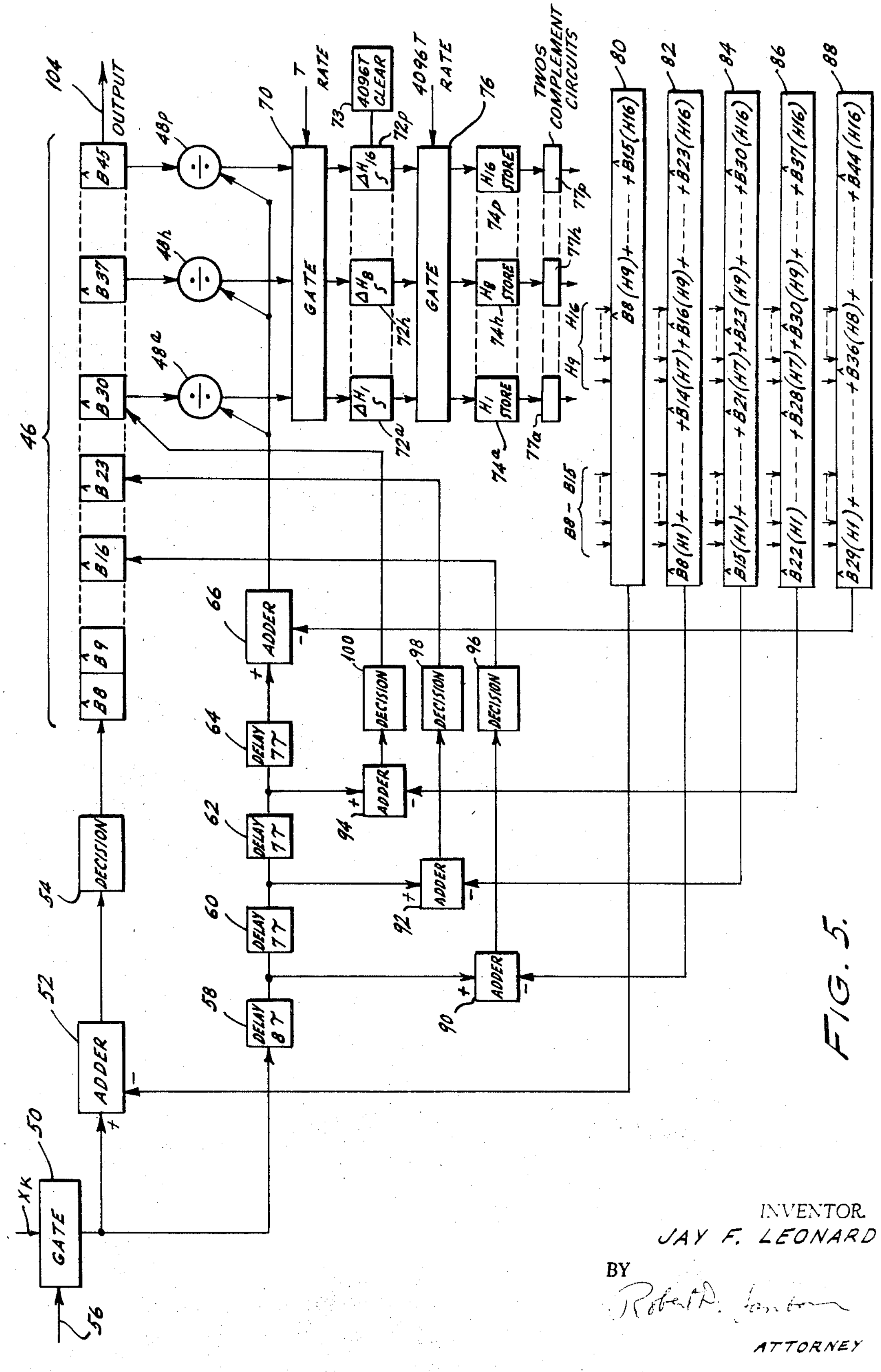
FIG. 5 is a more detailed diagram of estimator 12 of FIG. 1.

Turning now to the more detailed block diagram of FIG. 5, the estimator 12 comprises a 38 bit shift register 46 which, for convenience of reference, has stages identified as B8 to B45, respectively. For simplicity it will be assumed that shift register 46 is stepped at the symbol rate by conventional timing inputs not shown in FIG. 5. However, in practice, where eight level signals are employed, represented by three bits per symbol, each of the stages B8 to B45 may comprise three stages operating in parallel, one for each bit of the symbol. Additionally, instead of parallel readout from stages B30 to B45 to dividers 48*a* to 48*p* it may be desirable to use serial readout from stage B45 only. With serial readout the shift register is stepped at a multiple of the symbol rate so that a complete recirculation occurs once each symbol period. If a recirculating shift register is employed it will be necessary to include a connection from the output stage B45 to the input stage B8.

The signal $X_k$ from sampler 24 is supplied through gate circuit 50, adder 52 and decision circuit 54 to the input stage B8 of shift register 46. Because the input to adder 52 from circuit 80 is in "twos complement" form, adder 52 supplies an output signal representative of the difference between the signals supplied by gate 50 and circuit 80. Gate circuit 50 is opened at the symbol rate by a timing signal on input 56 to pass the input signal $X_k$ to one input of adder 52 and the input of delay line 58. Delay line 58 has a delay time equal to eight symbol periods. Decision circuit 54 is a slicer circuit which provides an output representative of the amplitude level of the input signal. In a system operating on a two level signal the output of decision circuit 54 may be either a "one" or a "zero". In a system operating on eight levels, the output of decision circuit 54 will be a three digit code of the form "001", "011" etc.

The output of delay line 58 is connected through three serially connected delay lines 60, 62 and 64 to one input of a two-input adder circuit 66. The output of adder 66 is applied in parallel to each of the divider circuits 48[a – 48*p*. If serial readout from shift register 46 to a single divider 48 is employed, adder 66 may be a "-sample and hold" circuit which maintains its output fixed for one symbol period. The outputs of divider circuits 48*a* – *48p* are supplied in parallel by way of gate circuit 70 once each symbol period to parallel integrator or accumulator stages 72*a* – *72p*, respectively. The accumulated signals in stages 72*a* – *72p* are supplied in parallel to storage stages 74*a* – *74p* by way of gate circuit 76. Stages 74*a* to *74p* are also identified as $H_1$ store to $H_{16}$ store respectively. While parallel transfer from circuits 72*a* – *72p* to 74*a* ' *74p* has been shown, it should be understood that stages 72*a* – *72p* may take the form of a recirculating memory with appropriate read-in from a single divider 48 to one of the stages 72. Similarly, circuit 74*a* – *74p* may be a recirculating storage register with a single input and output properly timed by suitable gate circuits. Again, if eight level signals are employed, each of the stages 72*a* – *72p* and 74*a* – *74p* may comprise three stages operating in parallel, one for each of the three bits of the eight levels represented. If the receiver is to operate interchangeably with two level, four level and eight level signals, switching complexity can be avoided by processing all signals as eight level signals with a suitable code converter circuit included between decision circuit 54 and shift register 46. Estimator 12 is provided with five BxH product summing circuits 80, 82, 84, 86 and 88. Each of the product summing circuits receives inputs from appropriate stages of shift register 46 and stages 74*a* – *74p* ($H_1$ to $H_{16}$) to form the following product summations.

Product Summations

| Summing Circuit | |
|---|---|
| 80 | $B8(H_9)+B9(H_{10})+B10(H_{11})+B11(H_{12})+B12(H_{13})+B13(H_{14})+B14(H_{15})+B15(H_{16})$ |
| 82 | $B8(H_1)+ \ldots +B14(H_7)+B16(H_9)+ \ldots +B23H_{16})$ |
| 84 | $B15(H_1)+ \ldots +B21(H_7)+B23(H_9)+ \ldots +B30(H_{16})$ |
| 86 | $B22(H_1)+ \ldots +B28(H_7)+B30(H_9)+ \ldots +B37(H_{16})$ |
| 88 | $B29(H_1)+ \ldots +B44(H_{16})$ |

Note that only circuit 88 includes the $H_8$ input corresponding to the maximum amplitude of the distorted received pulse. Note also that circuit 80 sums only the lagging terms $H_9$ – *H16* while the other circuits sum both leading and lagging terms. The output of product summing circuit 80 is supplied to a second input of adder circuit 52 as previously described. The outputs of circuits 82, 84, 86 and 88 are supplied respective inputs of adders 90, 92, 94 and 66. Adders 90, 92 and 94 receive second inputs from delay lines 58, 60 and 62 respectively. The outputs of adders 90, 92 and 94 are supplied to decision circuits 96, 98 and 100 the outputs of which are connected to stages B16, B23 and B30 respectively of shift register 46 so as to replace or override the signal supplied by the preceding stage of the shift register. The outputs of adders 90, 92, 94 and 66, as well as the output of adder 52, will change each symbol period owing to the change in the $X_k$ signal as it passes down delay lines 58, 60, 62 and 64 and the changes in the B inputs to circuits 80, 82, 84, 86 and 88. As explained above the signals supplied to the adders by the product summing circuits are in "twos complement" form so that the adders, in effect, have an output signal representative of the difference between the signals supplied by delay lines 58, 60, etc. and the signals supplied by the product summing circuits 80, 82, etc. The output signal which is representative of the signal $X_k$, refined to remove the effects of intersymbol interference, is provided in serial fashion on lead 104 at the output of stage B45 of shift register 46.

The operation of estimator 12 may be outlined as follows: The four feedback loops (the four vertical lines on the left of FIG. 5 which are associated with adder circuits 52, 90, 92, and 94, respectively) subtract the interfering terms from the received signal and the remainder of the signal passes through decision circuits to determine with high probability which symbol was actually transmitted. These decisions are then placed in the 38 symbol shift register 46 where they are used in computing the succeeding interference terms, and also, in updating the "H" estimates (the wire line characteristics may change with time, and therefore, the "H" estimates must be updated continuously). A fifth feedback loop, comprising the line connecting circuit 88 to an input terminal of adder 66, subtracts from the delayed received signal supplied to the other input of adder 66 a synthesis of that delayed received signal, i.e. the best estimate of that delayed received signal. The difference between the delayed received signal and the estimate thereof appears at the output of adder 66; this difference also is used in updating the "H" estimates.

In operation, the sample ($X_k$) is first applied to an adder 52 where the lagging, or single sided, interference terms (those represented by $H_9$ to $H_{16}$ inclusive) are removed. The difference is then passed through decision circuit 54 to produce B8, the first rough decision as to the identity of the received symbol. This decision or symbol is then placed in the shift register 46. The shift register 46 shifts once each time a new $X_k$ is sampled, and the original B8 decision becomes B15 after seven more symbols are received. The B15 to B8 decisions are then used in computing the new lagging interference term in product summing circuit 80.

The $X_k$ term is delayed eight symbols by the 8T delay 58 shown in FIG. 5 and again applied to an adder 90 which, as explained above, functions as a subtractor. At this time, decisions have accumulated which allow the subtraction of the leading term interference ($H_1$ to $H_7$ inclusive) as well as the lagging term interference ($H_9$ to $H_{16}$). This then results in an improved decision being placed into stage B16 of register 46 by decision circuit 96. Two more iterations of this process produce inputs to stages B23 and B30, each succeeding decision being more refined than the last.

The B30 to B45 portion of the shift register 46 now contain the best decisions which can be made on the received signals. These decisions are then used, in conjunction with the $X_k$'s, to compute the final H estimates.

The signal from circuit 88 represents the estimator's best estimate of the received signal, $X_k$, since the estimate is formed using the B30 through B45 decisions. Note that this signal is the only one which contains an $H_8$ term in addition to the interference terms. Therefore, when this sum is subtracted from the delayed $X_k$, in adder 66, the difference will represent the error in the estimator's computations. This error is first normalized by dividing by the decision, and the resulting dH's placed in individual accumulators 72*a* – 72*p* which are, in effect, integrators. The purpose of the integrators is to remove noise from the calculations. After 4,096 dH's have been accumulated, the 16 dH sums are each divided by 4,096 to complete the integration process. They are then used to update, or correct, the stored H's in circuits 74*a* – 74*p*.

A more detailed explanation of the operation of the circuit of FIG. 5 is as follows:

At the beginning of a new symbol time, the input signal sample $X_k$, to gate 50 is applied to adder 52. The complement of the estimator's single-sided interference estimate generated in circuit 80 as the result of previously received symbols is applied to the other input of the adder 52. The output of adder 52 is then applied to a threshold or decision circuit 54 where the first rough decision is made. The difference between $X_k$ and the single sided interference term from circuit 80 is applied to the B8 stage of the shift register 46. At the beginning of the symbol the B8 stage of the register 46 had been cleared to a '0' condition in preparation for receiving a new B8 signal.

At the beginning of a symbol, the $X_k$ which had been sampled 29 symbols earlier appears at the output of delay line 64. From this delayed $X_k$ is subtracted the best estimate of the signal including intersymbol interference that was received at that time. This estimate is represented by the signal from circuit 88. The difference, which appears as the output of adder 66, is the error between the actual and the estimated signal, and this difference is stored for the duration of the symbol.

This difference, or error, represented by the output of adder 66 is divided by each of the decisions stored in stages B30 to B45 of shift register 46. This division takes place in dividers 48*a* to 48*p*. The B8 decision that had been made 29 symbols earlier, and updated three times, now appears in the B37 shift register. When B37 divides into the signal supplied by adder 66 in divider 48*h*, the result is the error between the estimated $H_8$ and the actual $H_8$ and this error is accumulated in stage 72*h*. Similarly, errors in the remaining H's are accumulated in stages 72*a* – 72*g* and 72*i* – 72*p* by dividing the output of adder 66 by the remaining decisions in stages B30 to B45 of register 46.

During the next symbol time, the entire process is repeated with the new set of quotients being added to the H's in storage in stages 72*a* – *72p*. Finally, after 4096 cycles, each quantity stored in stages 72*a* to 72*o* respectively is divided by 4096 and added to the set of H's stored in stages 74*a* – *74p* by means of gate 76. At the same time, stages 72*a* – *72p* are cleared to "zero" by means 73 in preparation for a new 4096 symbol accumulation period.

During each symbol time, the stored H's are passed through twos complement circuitry 77*a* to 77*o* respectively to the product summing circuits 80, 82, 84, 86 and 88. The product summing circuits compute the five equations previously identified which constitute the feedback terms. It will be recognized that divider circuits 48*a* – *48p*, *accumulator stages 72a – 72p* and stages 74*a* – *74p* together with associated gate circuits form a cross-correlator circuit which cross-correlates the signals in stages B30 to B45 with the signal at the output of adder 66 and supplies the results of this cross-correlation to appropriate inputs to product summing circuits 80, 82, 84, 86 and 88. Obviously other forms of cross-correlators may be substituted for the one shown in FIG. 5 without departing from the invention.

The decisions from circuits 96, 98 and 100 are supplied to stages B16, B23 and B30 of register 46, displacing the signals which would normally be shifted into these stages from stages B15, B22 and B29, respectively. Obviously in some configurations of the circuit of FIG. 5 it would be possible to break register 46 into four separate registers having an input stage B8, B16, B23 and B30. However, certain economies in circuit components, such as using a single divider 48 may be achieved by operating register 46 as a recirculating register and recirculating data through all of the stages B8 through B45 once each symbol time. For this operation connections are required from stages B15 to B16, B22 to B23, etc.

It will be seen that delay line 62, adder 94, product summation circuit 86, decision circuit 100 and sections B22 through B37 of register 46 together comprise a unit for refining the estimate previously made by decision circuit 98. The circuits making up this unit including seven stages of register 46 may be removed at the expense of one level of refinement in the final signal estimate. Similarly, adders 92 or 90 or both and circuits associated therewith can be removed as a unit at the expense of an additional level of refinement of the estimate. Alternatively, the number of refinement units may be increased over the number shown in FIG. 5. In removing or adding sections to the shift register it should be kept in mind that the connections to the remaining product summation circuits 82, 84, 86 and 88 should be adjusted so that each receives input from the seven stages of register 46 preceding and eight stages following the stage preceding the stage to which the output of the corresponding decision circuits 96, 98 or 100 is connected.

The estimator will function with only product summing circuit 80. This may be accomplished by removing delay stages 58, 60, 62 and 64, adders 90, 92, 94 and 66, decision circuits 96, 98 and 100 and the appropriate stages of shift register 46. In such an arrangement the input to dividers 48*a* – *48p*, now connected to the output of adder 66, may be reconnected to the output of adder 52.

A more detailed explanation of the operation of estimator 12 with an eight level signal and recirculating registers 46, 72 and 74, as well as a more detailed explanation of how the product summation may be formed in each of the circuits 80, 82, 84, 86 and 88, is set forth hereinafter with specific reference to FIG. 6 of the drawings.

The estimator's timing is based on one symbol time. During each symbol, a set of "start of symbol" (TP1, 2, 3, & 4) and "end of symbol" (TP8, 9, 10) pulses are generated. Between these two sets of pulses, 16 basic sets of computations are made in the estimator.

Figure 6:
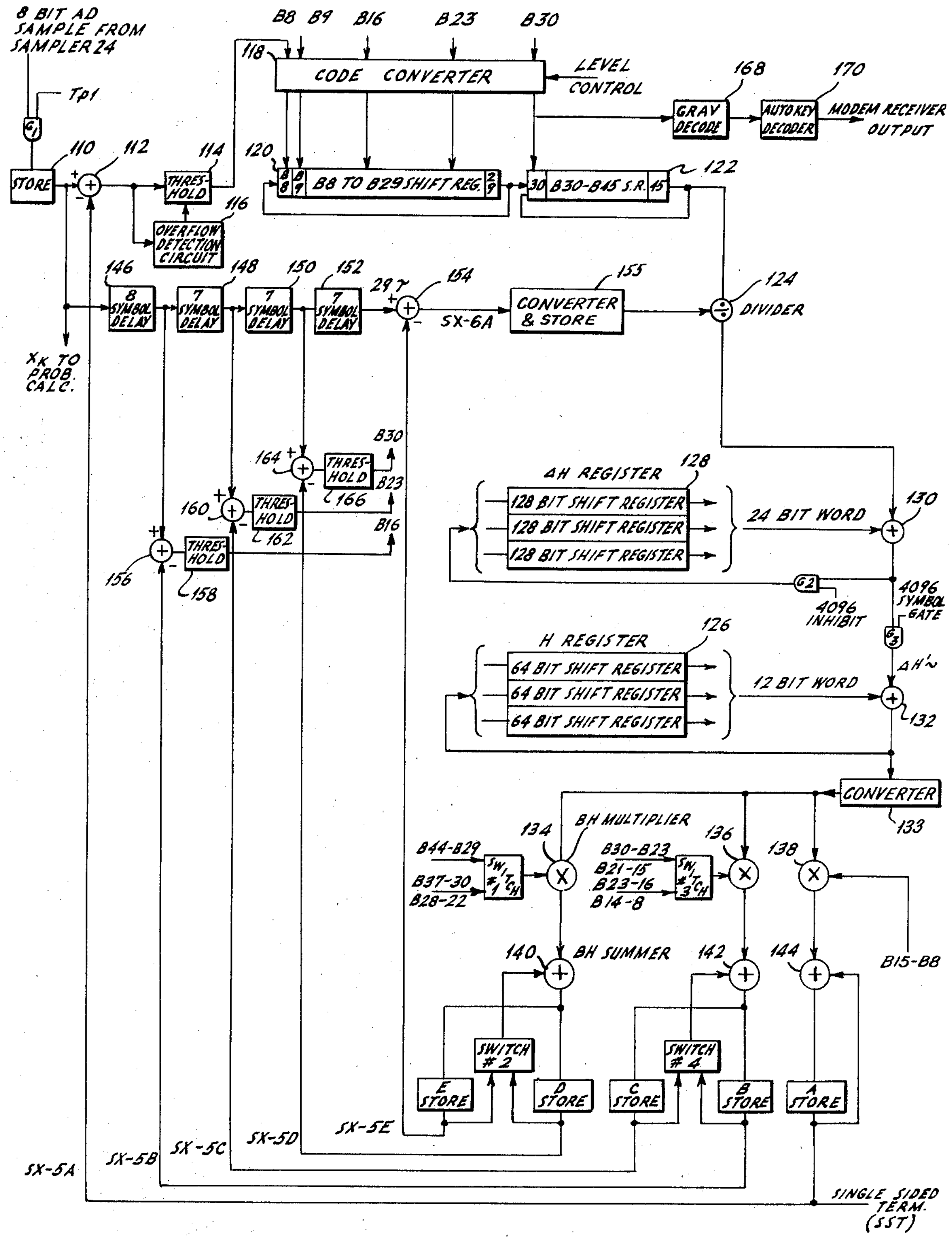
FIG. 6 is a detailed diagram of an alternative embodiment of the estimator 12 of FIG. 1.

At the beginning of a new symbol time, the eight-bit A/D sample, $X_k$, is gated into a temporary store 115 in the estimator by gate G1 shown in the upper left portion of FIG. 6. The stored $X_k$ is then applied, in parallel, to the adder 112 and to the input of delay line 146, and the complement of the estimator's single-sided interference estimate is applied to the other input of the adder. The output of the adder is then applied to a threshold circuit 114 where the first rough decision is made. The adder output is also applied to an overflow detection circuit 116 which senses that the range of the adder is exceeded and adjusts the threshold circuit accordingly. The following Table 1 lists the decisions which are made by the threshold circuitry for the 256 possible adder outputs.

TABLE 1

DECISION LEVELS

| Binary Representation | Difference Value From Adder 112 | Decision Level 8-Level | 4-Level | 2-Level |
|---|---|---|---|---|
| 0 1 1 1 1 1 1 1 | + 127 | +16 | +8 | +2 |
| 0 1 1 1 1 0 0 0 | +120 | +15 | . | |
| | . | . | . | |
| 0 1 0 0 0 0 0 0 | +64 | +8 | +4 | +1 |
| 0 0 1 1 1 0 0 0 | +56 | +7 | | |
| 0 0 1 1 0 0 0 0 | +48 | +6 | +3 | |
| 0 0 1 0 1 0 0 0 | +40 | +5 | | |
| 0 0 1 0 0 0 0 0 | +32 | +4 | +2 | |
| 0 0 0 1 1 0 0 0 | +24 | +3 | | |
| 0 0 0 1 0 0 0 0 | +16 | +2 | +1 | |
| 0 0 0 0 1 0 0 0 | + 8 | +1 | | |
| 0 0 0 0 0 0 0 0 | 0 | | | |
| 1 1 1 1 1 0 0 0 | − 8 | −1 | | |
| 1 1 1 1 0 0 0 0 | −16 | −2 | −1 | |
| 1 1 1 0 1 0 0 0 | −24 | −3 | | |
| 1 1 1 0 0 0 0 0 | −32 | −4 | −2 | |
| 1 1 0 1 1 0 0 0 | −40 | −5 | | |
| 1 1 0 1 0 0 0 0 | −48 | −6 | −3 | |
| 1 1 0 0 1 0 0 0 | −56 | −7 | | |
| 1 1 0 0 0 0 0 0 | −64 | 8 | −4 | −1 |
| | . | . | . | |
| | . | . | . | |
| | . | . | . | |
| 1 0 0 0 0 0 0 0 | −128 | −16 | −8 | −2 |

In the 8-level case, the only decisions of interest are ±1, ±3, ±5, or ±7, since these are the only transmitted signals. Intersymbol interference may cause the received signal to sum to 16. Similarly, ±1, ±3, in the 4-level mode and ±1 in 2-level mode are the only levels of interest in these modes. The decisions actually are shown opposite the midpoint of their decision region. For example, +5 is the decision shown for an 8-level adder output of +40. Actually, and adder output value from +32 to +47 would result in a +5 decision. If, for example, $X_k$ was received as +80 and the computed single sided interference term is +45, then the difference value of +35 out of the adder results in a decision of +5. The following Table 2 is a tabulation of the decision regions (difference ranges) for all decisions.

TABLE 2

DIFFERENCE RANGES

| Difference Ranges | 8-Level Decision | 4-Level Decision | 2-Level Decision |
|---|---|---|---|
| +48 to +127 | +7 | +3 | +1 |
| +32 to 47 | +5 | +3 | + 1 |
| +16 to 31 | +3 | +1 | +1 |
| 0 to 15 | +1 | +1 | +1 |
| − 1 to − 16 | −1 | −1 | −1 |
| −17 to − 32 | −3 | −1 | −1 |
| −33 to − 48 | −5 | −3 | −1 |
| −49 to −128 | −7 | −3 | −1 |

CODECONVERTER

| 8 LEVEL DECISION | BINARY | 4 LEVEL DECISION | BINARY | 2 LEVEL DECISION | BINARY |
|---|---|---|---|---|---|
| +7 | 0.11 | +3 | 0.01 | | |
| +5 | 0.10 | | | +1 | 0.00 |
| +3 | 0.01 | +1 | 0.00 | | |
| +1 | 0.00 | | | | |
| −1 | 1.11 | −1 | 1.11 | | |
| −3 | 1.10 −1 | | | | 1.11 |
| −5 | 1.01 | | | | |
| −7 | 1.00 | −3 | 1.10 | | |

SX-5A = B8(H9)—+B15(H16)

SX-5B=B8(H1)–+B14(H7)+ 0 +B16(H9)–+B23(H16)

SX-5C=B15(H1)–B21(H7)+ 0 +B23(H9)–+B30(H16)

SX-5D–B22(H1)–B28(H7)+ 0 +B30(H9)–+B37(H16)

SX-5E=B29(H1–+B35(H7)+B36(H8) +B37(H9)–+B44(H16)

All decisions made by the threshold circuits are 8-level decisions. If the modem is in the 4-level or 2-level mode, the code converter 118 converts the 8-level decision to the appropriate 4- or 2-level one. Regardless of whether the code converter output represents a 2-, 4- or 8-level signal, the converter output is always a three-bit binary number. These binary numbers are tabulated in the following table 3.

TABLE 3

CODE CONVERTER

| 8 LEVEL DECISION | 8 LEVEL BINARY | 4 LEVEL DECISION | 4 LEVEL BINARY | 2 LEVEL DECISION | 2 LEVEL BINARY |
|---|---|---|---|---|---|
| +7 | 0.11 | +3 | 0.01 | +1 | 0.00 |
| +5 | 0.10 | | | | |
| +3 | 0.01 | +1 | 0.00 | | |
| +1 | 0.00 | | | | |
| −1 | 1.11 | −1 | 1.11 | −1 | 1.11 |
| −3 | 1.10 | | | | |
| −5 | 1.01 | −3 | 1.10 | | |
| −7 | 1.00 | | | | |

TABLE 4

DEFINITIONS OF TERMS

| | | |
|---|---|---|
| SX-5A= | | B8(H9)—+B15(H16) |
| SX-5B=B8(H1)—+B14(H7)+ | 0 | +B16(H9)—+B23(H16) |
| SX-5C=B15(H1)–B21(H7)+ | 0 | +B23(H9)—+B30(H16) |
| SX-5D=B22(H1)–B28(H7)+ | 0 | +B30(H9)—+B37(H16) |
| SX-5E=B29(H1)–B35(H7)+B 36(H8) | | +B37(H9)—+B44(H16) |

The shift registers 120 and 122 driven by the code converters must be capable of storing and shifting these three-bit decisions. Therefore, the eight bit shift register shown receiving the B8 decision actually contains three parallel sets of eight shift registers. With these preliminary thoughts, let us follow a sequence of operations for one symbol time.

At the beginning of a symbol time (TP1) the A/D register in Sampler 24 is sampled by gate G1 and the contents stored in the store 110 and also immediately applied to the first adder. During the previous symbol, the single-sided term (SX-5A) was computed and its complement is applied to the other side of the adder at the start of a symbol. The difference between $X_k$ and (SX-5A) is applied to the code converter and finally sampled into the $\hat{B}8$ stage of the shift register. At TP1 time, the $\hat{B}8$ stage of the register had been cleared to a '0' condition in preparation for receiving a new $\hat{B}8$.

At the beginning of a symbol, the $X_k$ which had been sampled 29 symbols earlier appears at the point labeled 29$\tau$. From this delayed $X_k$ is subtracted the estimator's best estimate of the symbol that was transmitted at that time (SX-5E in the equations in Table 4. The difference, labeled SX-6A, is the error between the actual and the estimated signal, and this difference is converted by converter and store 155 to sign/magnitude form and stored for the duration of the symbol.

This difference, or error, is divided by each of the decisions stored in the B30 to B45 shift register 122. The B8 decision that had been made 29 symbols earlier, and updated three times, now appears in the B37 shift register. When B37 divides into the delayed $X_k$ in divider 122, the result is the error between the estimated H8 and the actual H8 and this error is accumulated in the H register 126 in a 24 bit slot reserved for H8. Similarly, errors in the remaining H's are accumulated in the H register by dividing SX-6A by the remaining decisions in the B30 to B45 register 122.

The division process is serial; i.e., the decisions B45 to B30 are serially applied (in that order) to the divisor input of the divider 124. As the decisions are applied to the divider, they are also recirculated in the shift register as shown so that they are not lost in the shifting process.

The ΔH Register 128 contains sixteen 24 bit slots (one slot for each ΔH) for accumulating the ΔH calculations. It is arranged as a recirculating register which passes all its data through the adder 130 during each symbol time. The quotient from the divider is applied to the other adder input so that it may be added to the proper ΔH storage position during the recirculation.

At the start of a symbol, the least significant 12 bits of the ΔH16 slot is applied to the adder. This is added to the 12 bit quotient of the error signal divided by B45, and the sum placed in the first half (least significant) of the ΔH16 memory slot. Any carry resulting from the addition is temporarily stored. The most significant 12 bits of ΔH16 are now applied to the adder 130 and the sign of the quotient is spread over 12 bits and added to the other adder input along with the stored carry signal. This sum is stored in the most significant 12-bit slot for ΔH16. The ΔH15 slot is now shifted into place for addition and simultaneously the B30–B45 shift register is shifted once, making the new quotient out of the divider 124 equal to the error divided by B44. The process is repeated until ΔH1 is calculated and restored (using B30) at which time ΔH16 is shifted into adding position. The cycle ends here with ΔH16 in position to be the first ΔH to be operated on during the next symbol.

During the next symbol time, the entire process is repeated with the new set of quotients being added to the ΔH's in storage. Finally, after 4096 cycles, each ΔH is divided by 4096 and added to the set of H's stored in the H register by means of gate G3. At the same time, the ΔH register is cleared to '0' by inhibiting gate G2 in preparation for a new 4096 symbol accumulation period.

The H register operation is similar to that of the ΔH register. There are 16 12-bit H's stored in this register and they recirculate through the adder 132 synchronously with the ΔH's; i.e., H16 appears at the H register output at the same time that ΔH16 appears at its register output, and so on. The updating, or adjustment of the H's takes place every 4096 symbols by gate G3 allowing a ΔH to be added to each corresponding H in the registers. During the other 4095 symbols, a 0 is placed on the ΔH input to the adder by gate G3 allowing the stored H's to recirculate without change.

During each symbol time, the stored H's are serially passed through the twos complement to sign-magnitude converter (133) and applied to the multiplies 134, 136 and 138. The circuitry at the bottom of the figure computes the five equations shown in Table 4 which constitute the feedback terms. The multipliers and adders are time shared so that the SX-5D and -5E terms are produced by one multiplier/adder pair and SX-5B and -5C are produced by a second pair.

To illustrate how the equations are formed, consider the production of SX-5D and -5E. At the beginning of each symbol, all storage registers A, B, C, D, and E. at the bottom of the figure are cleared to '0.' During each symbol, the H's are serially fed to the multiplier 134 beginning with H16 and ending with H1. While H16 is applied, SWITCH No. 1 allows B44 to be applied through a sign-magnitude converter. The product is then converted and applied to the adder 140 whose other input has the contents of the E storage applied through SWITCH No. 2. The sum is then dropped into the E storage by a pulse TP7. While H16 is still applied to the multiplier, SWITCH No. 1 turns off B44 and allows B37 to be applied to the multiplier 134. Simultaneously, SWITCH No. 2 allows the D store contents to be switched to the adder. The resultant sum is then sampled into the D store by a pulse SW31. At this point, we now have the last two terms in the SX-5D and -5E equations, namely, $\hat{B}37$ (H16) and $\hat{B}44$ (H16).

After these two computations are completed, H15 is shifted into place for multiplication and the decision registers are each shifted once bringing $\hat{B}43$ and $\hat{B}36$ through their respective 2's complement to sign/magnitude converter to SWITCH No. 1. SWITCH No. 1 allows the $\hat{B}43$ (H15) product to be formed and SWITCH No. 2 allows it to be summed with the B44 (H16) product previously computed and presented stored in the E storage. Similarly, the $\hat{B}36$ (H15) product is formed and summed with $\hat{B}37$ (H16) presently in the D storage. At this time, the E storage contains the arithmetic sum $\hat{B}44(H16) + \hat{B}43(H15)$ and the D storage contains $\hat{B}37(H16) + \hat{B}36(H15)$. H14 is next shifted onto the multiplier input and the process continues. Whenever a serial term does not appear in the equation the multiplication and summing still take place but the sampling pulse placing a new sum into storage is inhibited. For example, the $\hat{B}29$(H8) term is missing from the SX-5D equation and it will be found that there is no pulse on the SW31 line during H8 time and therefore, that term does not become part of the stored number. The TP7 signal, on the other hand, will be found to have sixteen pulses during each symbol since the SX-5E equation contains sixteen terms. The SX-5B and -5C equations are formed in exactly the same manner as, and simultaneous with, the SX-5D and -5E equations. The SX-5A equation, or the single-sided term may be formed in similar manner by use of multiplier 138 and adder 144, except that, unlike multiplier 134 and adder 140 and unlike multiplier 136 and adder 142, multiplier 138 and adder 144 are not time-shared.

At the end of the computation cycle the "end of symbol" timing pulses are generated. One set of these pulses advances $X_k$ through the delays 146, 148, 150 and 152 by one symbol. The remainder of the pulses are used to advance the decision registers.

What is claimed is:

1. For use with a data transmission system which includes a limited bandwidth channel for conveying a data signal comprising a succession of periodic pulse symbols from a transmitter of said data signal to a remote receiver, an adaptive signal receiver comprising: means coupled to an output of said channel for developing an input signal representative of the data signal as propagated through said channel to said output, means for delaying said input signal, a plurality of symbol decision units, a plural stage shift register means, a succession of product summation units each comprising means for multiplying separately each pair of a plurality of pairs of quantities supplied thereto and for summing the respective products produced by said multiplications and each having associated therewith means for supplying thereto as respective ones of said quantities a set of signals respectively stored in successive stages of said shift register means, said set of said stored signals supplied to any given one of said product summation units other than the first thereof comprising signals which are progressively more delayed than are signals in said set of said stored signals supplied to the one of said product summation units preceding said given one thereof, means coupling an input of each of said symbol decision units to the output of a corresponding one of said product summation units and to a corresponding output of said output of said delay means, for supplying to respective ones of said decision units differently delayed versions of said received signal as corrected for intersymbol interference, means connecting the respective outputs of successive ones of said symbol decision units to selected successive, non-adjacent stages of said shift register, thereby to insert into said selected successive, non-adjacent stages the respective output signals of said successive ones of said symbol decision units, means coupled to an output of one of said product summation units and to an output of said means for delaying said input signal, for producing a signal representative of the difference between a delayed version of said input signal and a synthesis, produced by said one product summation unit, of said delayed version of said input signal, correlation means for correlating the outputs of given successive adjacent stages of said shift register with said signal representative of said difference, means coupling said correlation means to said given stages of said shift register and to an output of said means for producing said signal representative of said difference, and means for supplying given output signals of said correlating means to each of said succession of said product summation means, said given output signals supplied to said first of said product summation units being respectively representative of only those discrete time-spaced components of the impulse response of said limited bandwidth channel which lag the maximum-amplitude component of such response, said given output signals supplied to said one product summation unit being respectively representative of both said discrete lagging time-spaced components and said maximum-amplitude component as well as of those discrete time-spaced components of said impulse response which lead said maximum-amplitude component thereof, and said given output signals supplied to said product summation units other than said first and said one units being respectively representative of only said discrete lagging time-spaced components and said discrete leading time-spaced components, each of said given output signals constituting the other of said quantities in a respective one of said pairs, whereby said decision units produce successively more refined estimates of the form of the received signal minus channel-introduced inter-symbol interference.

2. A receiver as set forth in claim 1 wherein said correlator means comprises signal divider means having first and second signal input means connecting at least one stage of said shift register means to said first input of said divider means, said connecting means permitting the supply of the data stored in a plurality of stages of said shift register to said divider means, means supplying to said second input of said divider means said signal representative of said difference between said delayed version of said input signal and said synthesis, and means for integrating each output of said divider means on a symbol by symbol basis over a plurality of symbol intervals.

3. For use with a data transmission system which includes a limited bandwidth channel for conveying a data signal comprising a succession of periodic pulse symbols from a transmitter generating said signal to an output remote from said transmitter, said channel being responsive to a transmitted unit impulse to produce at said remote output a wave having, at each of given successive times spaced by said period, an amplitude and a sign hereinafter collectively termed "impulse component", a first plurality of said impulse components occurring at those of said given successive times which are prior to the time of occurrence of that one impulse component representative of the amplitude and sign of said transmitted unit impulse, and a second plurality of said impulse components occurring at those of said given successive times which are after said time of occurrence of said one impulse component, said impulse components changing in value in response to changes in the physical characteristics of said channel, the signal received at said remote output in response to said transmitted data signal comprising, at said given successive times, a first part representative of the amplitude and sign of one of said pulse symbols of said transmitted data signal, a second part representative of the amplitude and sign of the contemporaneous sum of the leading portions of others of said pulse symbols transmitted after said one pulse symbol, and a third part representative of the amplitude and sign of the contemporaneous sum of the lagging portions of others of said pulse symbols transmitted before said one pulse symbol:

an adaptive signal receiver comprising means coupled to said output of said channel for sampling said received signal at said given successive times, thereby to provide at each of said times an input signal representative of the contemporaneous sum of said three parts of said received signal, means for producing at each of said successive times, in response to said input signal and to a first correction signal approximately representative of said third part of said received signal, a first output signal substantially equal to the difference between said input signal and said first correction signal, first decision means for producing, in response to said first output signal and at each of said successive times, a first digital signal representative of a first estimate of the one of said transmitted pulse symbols to which said first part of said received signal corresponds, first shift register means comprising a plurality of successive adjacent stages at least equal in number to the number of impulse components in said second plurality thereof and including an input stage, means for supplying said first digital signal to said input stage, means also supplied with said input signal for delaying said input signal by at least the same number of pulse symbol periods as said number of impulse components in said second plurality thereof, thereby to produce a first delayed input signal, means for producing at each of said successive times, in response to said first delayed input signal and to an intermediate correction signal approximately representative of both said second part and said third part of said received signal, a second output signal substantially equal to the difference between said first delayed input signal and said intermediate correction signal, second decision means for producing, in response to said second output signal and at each of said successive times, a second digital signal representative of another estimate of said one of said transmitted pulse symbols to which said first part of said received signal corresponds, second shift register means comprising a plurality of successive adjacent stages which include an input stage and are at least equal in number to one less than the total number of said impulse components in both said first plurality thereof and said second plurality thereof, means for supplying said second digital signal to said input stage of said second shift register means, means responsive to said input signal for producing a replica of said input signal delayed by at least the same number of pulse symbol periods as said total number of impulse components in both said first and second pluralities thereof, means for producing at each of said successive times, in response to said replica of said input signal and to a synthesized signal representative of that input signal to which said replica corresponds, a third output signal substantially equal to the difference between said replica and said synthesized signal, means, supplied with said third output signal and with the respective estimates of successive ones of said transmitted pulse symbols stored in successive adjacent stages of said second shift register means, for cross-correlating said third output signal with said respective estimates, thereby to produce signals respectively representative of said one impulse component and said other impulse components of said first plurality and said second plurality, and first, second and third product summation means for producing respectively said first and intermediate correction signals and said synthesized signal, each of said product summation means comprising means for multiplying separately each pair of a plurality of pairs of quantities supplied thereto and for summing the respective products produced by said multiplications, one of said quantities of each pair representing one of said signals respectively representative of said impulse components and the other of said quantities of each pair representing one of said estimates, stored in said first and second shift register means, of said transmitted pulse symbols, means for supplying to said first product summation means said signals respectively representative of said impulse components of only said second plurality thereof, and said estimates respectively stored in successive stages of only said first shift register means, said pairs respectively comprising on the one hand time-successive ones of said impulse components of said second plurality and on the other hand successive ones of said estimates respectively stored in successive stages of said first shift register, means for supplying to said second product summation means said signals respectively representing said impulse components of both said first and second pluralities thereof, and respective estimates stored in both said first and said second shift register means, said pairs respectively comprising on the one hand time-successive ones of said impulse components of said first plurality and on the other hand successive ones of said estimates respectively stored in successive stages of said first shift register means, said pairs also comprising on the one hand time-successive ones of said impulse components of said second plurality and on the other hand successive ones of said estimates respectively stored in successive stages of said second shift register means, and means for supplying to said third product summation means said signals respectively representing said one impulse component and said impulse components of both said first and said second pluralities thereof, and respective successive estimates stored in successive stages of at least said second shift register means.

* * * * *